(12) United States Patent
Saito et al.

(10) Patent No.: US 7,225,046 B2
(45) Date of Patent: May 29, 2007

(54) SEMICONDUCTOR MANUFACTURING APPARATUS, REMOTE CONTROL SYSTEM THEREFOR, AND REMOTE OPERATION DEVICE

(75) Inventors: Tsuyoshi Saito, Tokyo (JP); Kazuhiro Yokogawa, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 627 days.

(21) Appl. No.: 09/901,577

(22) Filed: Jul. 11, 2001

(65) Prior Publication Data

US 2002/0064138 A1 May 30, 2002

(30) Foreign Application Priority Data

Jul. 12, 2000 (JP) ............................. 2000-211849

(51) Int. Cl.
*G06F 19/00* (2006.01)
*G06F 7/04* (2006.01)
*G06F 7/58* (2006.01)

(52) U.S. Cl. ............................. 700/121; 726/3; 726/16
(58) Field of Classification Search ................ 713/201; 700/121, 237
See application file for complete search history.

(56) References Cited

U.S. PATENT DOCUMENTS

| 4,414,621 | A | * | 11/1983 | Bown et al. .................. 715/733 |
| 5,591,299 | A | * | 1/1997 | Seaton et al. ................ 700/121 |
| 5,650,940 | A | * | 7/1997 | Tonozuka et al. ........... 709/224 |

(Continued)

FOREIGN PATENT DOCUMENTS

JP 61-129945 6/1986

(Continued)

OTHER PUBLICATIONS

Japanese Office Action dated Aug. 1, 2006 with partial English Translation.

*Primary Examiner*—Gilberto Barrón, Jr.
*Assistant Examiner*—Kristin D. Sandoval
(74) *Attorney, Agent, or Firm*—McGinn IP Law Group, PLLC

(57) ABSTRACT

A remote control system for one or more semiconductor manufacturing apparatuses is provided which is capable of displaying at a remote operation device the same screen as that in a host device and performing through the remote control device the same operations as those carried out by the host device. The remote operation device includes a LAN system having one or more semiconductor manufacturing apparatuses (D) and a host device (H) on the semiconductor manufacturing apparatus side, and a remote operation device (L) having a communication element (Com) accessible to the host device (H) on the semiconductor manufacturing apparatus side through a communication line. The host device (H) implements an IP routing function and a necessary protocol for achieving remote operations from the remote operation device (L), and also a communication element (Com) with a message incoming function of messages incoming from the communication line. The host device (H) performs user authentication when the remote operation device is connected to the host device, whereby it becomes possible for the remote operation device thus authenticated to display the same screen as that displayed on the host device (H) and remotely operate and control the host device (H).

9 Claims, 4 Drawing Sheets

U.S. PATENT DOCUMENTS

| | | | | |
|---|---|---|---|---|
| 5,805,442 | A | * | 9/1998 | Crater et al. .................... 700/9 |
| 5,874,960 | A | * | 2/1999 | Mairs et al. ................. 715/733 |
| 5,930,768 | A | | 7/1999 | Hooban |
| 6,385,497 | B1 | * | 5/2002 | Ogushi et al. ............... 700/110 |
| 6,438,688 | B1 | * | 8/2002 | Nunn ............................ 713/2 |

FOREIGN PATENT DOCUMENTS

| | | |
|---|---|---|
| JP | 10-097966 | 4/1998 |
| JP | 10-268930 | 10/1998 |
| JP | 11-15520 | 1/1999 |
| JP | 11-122679 | 4/1999 |

* cited by examiner

SEMICONDUCTOR MANUFACTURING APPARATUS, REMOTE CONTROL SYSTEM THEREFOR, AND REMOTE OPERATION DEVICE

BACKGROUND OF THE INVENTION

1. Field of the Invention

The present invention relates generally to a remote control system for one or more semiconductor manufacturing apparatuses, and more particularly, it relates to such a remote control system, a semiconductor manufacturing apparatus and a remote operation device, in which a local area network system including one or more semiconductor manufacturing apparatuses and a supervisory device in the form of a host device can be accessed by the remote operation device with a communication means by way of communication lines so as to maintain the semiconductor manufacturing apparatuses under remote control through the host device.

2. Description of the Related Art

FIG. 8 is a block diagram illustrating the configuration of a known local area network (LAN) system in semiconductor manufacturing apparatuses.

In the past, in facilities such as factories for manufacturing semiconductors, a plurality (N) of semiconductor manufacturing apparatuses D'1, D'2 . . . D'N are connected through serial cables 1 such as RS232C cables, etc., with a terminal server TS' which is in turn connected through an Ethernet card to a host device H' thereby to constitute a local area network (LAN), so that monitors, events, alarms, lot processing, etc., of the semiconductor manufacturing apparatuses are supervised and controlled.

The LAN system of such a configuration is a so-called closed network in which communications can be made only between the host device H' and the terminal server TS' in the same network or only between the respective semiconductor manufacturing apparatuses D'1, D'2, . . . , D'N.

Therefore, the host device H' in such a known network is not provided with any drivers, software and the like necessary for performing the following basic functions for connection with terminals existing in remote places and host devices in other networks (hereinafter, referred to remote operation devices); (1) provision of a point-to-point protocol (PPP) and a serial communications function; (2) a serial communications function and an automatic call incoming function with respect to modems and terminal adapters; and (3) a routing function of routing an Internet protocol (IP) to different networks. In addition, the host device H' or each of the semiconductor manufacturing apparatuses D'1, D'2, . . . , D'N is not provided with any communication means such as modems, terminal adapters, etc., and any equipment such as access servers, etc., necessary for remote control operation, as a consequence of which it is impossible for the host device or each semiconductor manufacturing apparatus to communicate with the remote terminals.

On the other hand, there is a demand for accessing a host device connected with semiconductor manufacturing apparatuses from a remote operation device to display the same screen as that of the host device for remote control operation.

SUMMARY OF THE INVENTION

In view of the above circumstances, the present invention is intended to provide a remote control system for one or more semiconductor manufacturing apparatuses which is capable of accessing a supervisory device (host device) connected with the one or more semiconductor manufacturing apparatuses from a remote operation device thereby to display the same screen as that displayed in the supervisory device, and of conducting the same operations as those carried out on the one or more semiconductor manufacturing apparatuses by means of the supervisory device. Also, it is an additional object of the present invention to provide a remote control system for one or more semiconductor manufacturing apparatuses which is capable of authenticating a remote operation device, which is trying to access the supervisory device, for preventing unauthorized connection or access from an external device (third party) for improved safety.

In order to achieve the above objects, the present invention resides in a remote control system for one or more semiconductor manufacturing apparatuses capable of accessing a supervisory device of the one or more semiconductor manufacturing apparatuses from a remote operation device through a communication line, wherein the remote operation device displays the same screen as that displayed in the supervisory device, and enables the same operations as those carried out by the supervisory device to be performed on the one or more semiconductor manufacturing apparatuses.

With this configuration, the remote operation device lying in a remote place is able to display the same screen as that of the supervisory device, remotely control and operate the one or more semiconductor manufacturing apparatuses through the supervisory (host) device by accessing the supervisory device of the one or more semiconductor manufacturing apparatuses by way of the communication line.

In a preferred form of the present invention, the supervisory device performs user authentication when the remote operation device is connected to the supervisory device.

According to this feature, a third party is prevented from establishing a connection to or accessing the supervisory device and hence the one or more semiconductor manufacturing apparatuses for improved safety.

According to another aspect of the present invention, the present invention resides in a semiconductor manufacturing apparatus connected to the supervisory device accessible to the remote operation device.

According to a further aspect of the present invention, the present invention resides in a remote operation device for use with the above-mentioned remote control system for one or more semiconductor manufacturing apparatuses.

Moreover, a remote control system for one or more semiconductor manufacturing apparatuses according to one embodiment of the present invention comprises: a local area network system including a host device (supervisory device) and one or more semiconductor manufacturing apparatuses; and a remote operation device with a communication element accessible to the host device on the semiconductor manufacturing side by way of a communication line. The host device is provided with an IP routing function and protocols necessary for achieving remote control operation from the remote operation device, and a communication element having a call incoming function of receiving a call incoming from the communication line. The host device serves to perform user authentication when the remote operation device tries to connect to the host device, so that the remote operation device thus authenticated can display the same screen as that displayed on the host device, remotely control and operate the host device. In addition, the host device and the remote operation device each have a modem as the communication element for enabling connection between the host device and the remote operation device through an analog line or network (First Embodiment).

Further, in another embodiment of the present invention, the host device and the remote operation device each have a terminal adapter as the communication element for enabling connection between the host device and the remote operation device through an ISDN line or network (Second Embodiment).

Furthermore, according to the present invention, the local area network system on the semiconductor manufacturing apparatus side comprises a plurality of host devices each connected with one or more semiconductor manufacturing apparatuses, and a router as its communication element connected with the host devices. The remote operation device is equipped with a router as its communication element. In a further embodiment, connections between the host devices and the remote operation device are established through the Internet (Third Embodiment). In a yet further embodiment, connections between the host devices and the remote operation device are established through a local area network or a wide area network (Fourth Embodiment). With such configurations, it becomes possible for the remote operation device to individually display and manipulate the display screen of each host device.

Besides, according to a still further embodiment of the present invention, the local area network system on the semiconductor manufacturing apparatus side comprises a plurality of host devices each connected with one or more semiconductor manufacturing apparatuses, and an access server as a communication element connected with the host devices. The host devices can be connected via the access server to the remote operation device with a plurality of the same or different communication elements (Fifth Embodiment).

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, the present invention will be described in detail while referring to the accompanying drawings.

Figure 1:
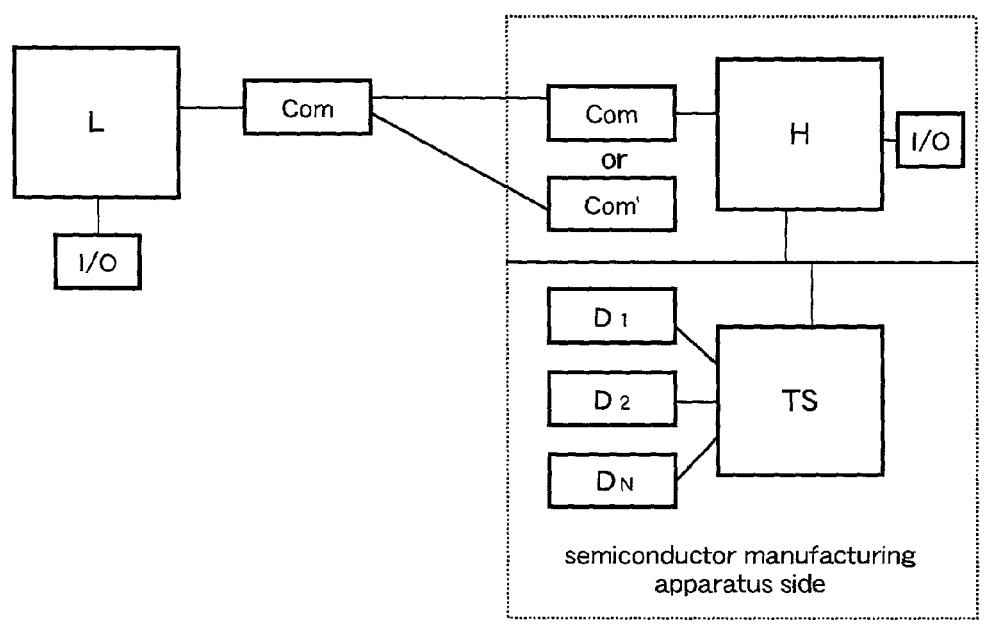
FIG. 1 is a constructional view illustrating a basic concept of a LAN system on a semiconductor manufacturing apparatus side in a remote control system for one or more semiconductor manufacturing apparatuses according to the present invention.
Figure 2:
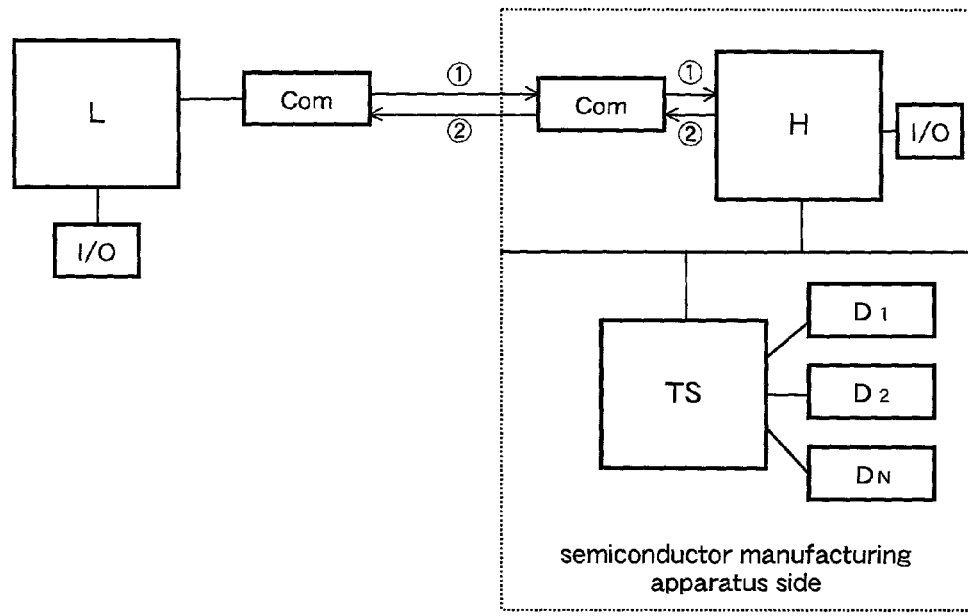
FIG. 2 is a schematic view illustrating a basic configuration of the remote control system for one or more semiconductor manufacturing apparatuses according to the present invention.
Figure 3:
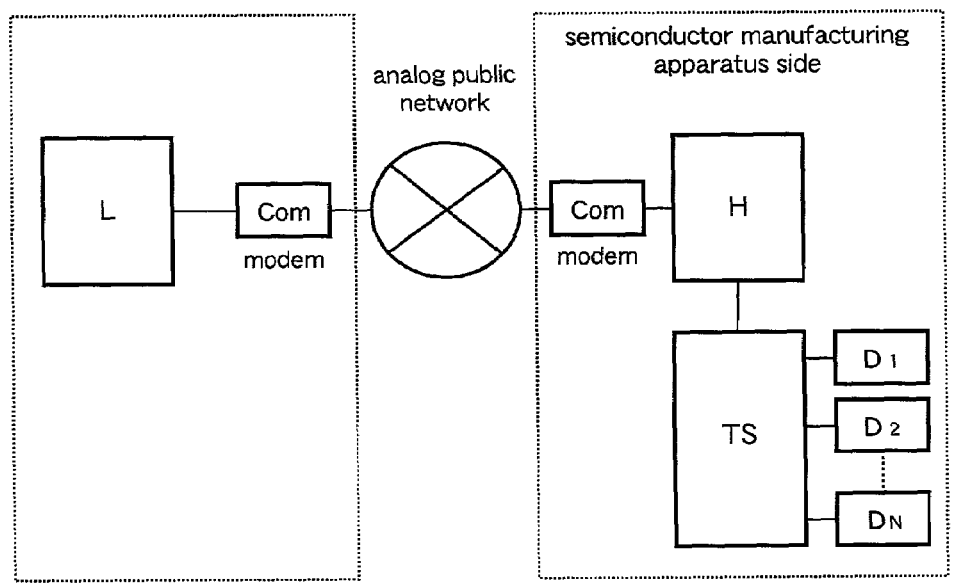
FIG. 3 is a schematic view illustrating a remote control system for one or more semiconductor manufacturing apparatuses according to a first embodiment of the present invention.
Figure 4:
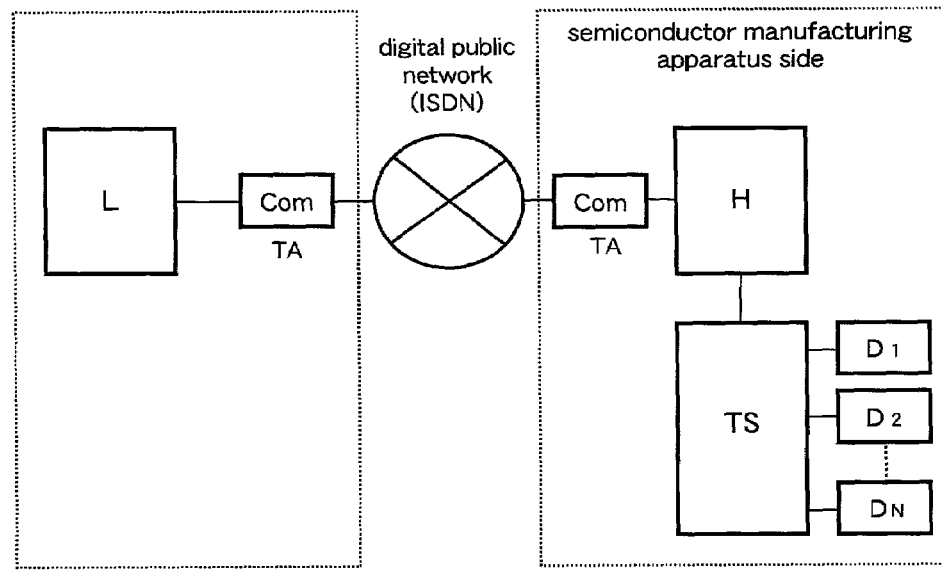
FIG. 4 is a schematic view illustrating a remote control system for one or more semiconductor manufacturing apparatuses according to a second embodiment of the present invention.
Figure 5:
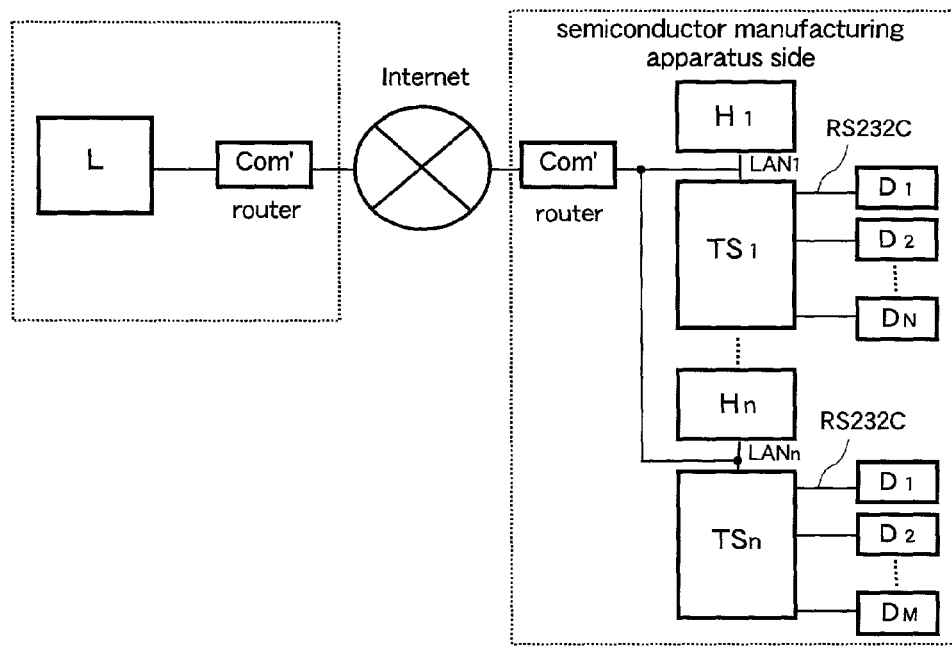
FIG. 5 is a schematic view illustrating a remote control system for one or more semiconductor manufacturing apparatuses according to a third embodiment of the present invention.
Figure 6:
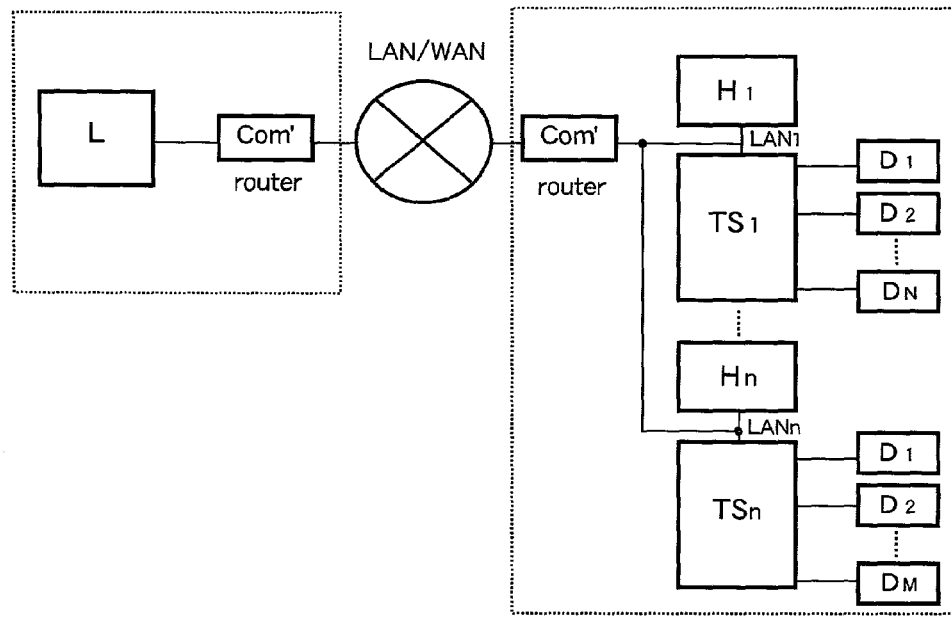
FIG. 6 is a schematic view illustrating a remote control system for one or more semiconductor manufacturing apparatuses according to a fourth embodiment of the present invention.
Figure 7:
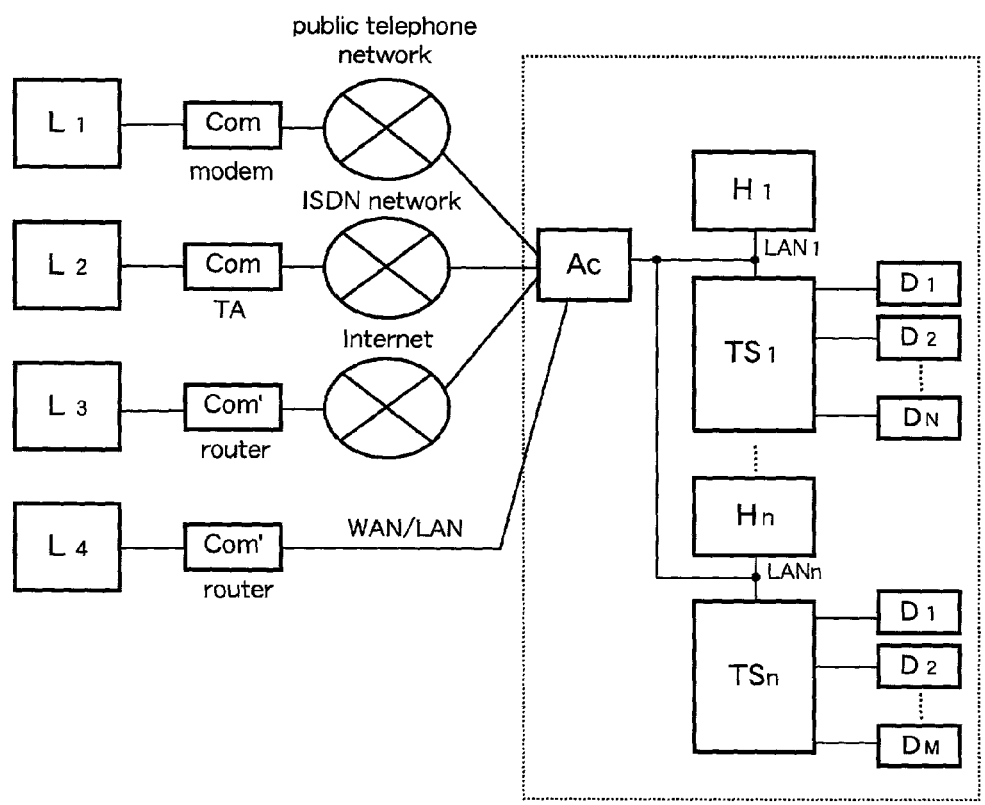
FIG. 7 is a schematic view illustrating a remote control system for one or more semiconductor manufacturing apparatuses according to a fifth embodiment of the present invention.
Figure 8:
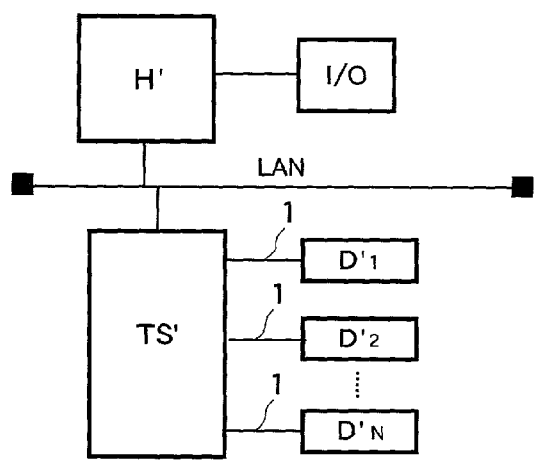
FIG. 8 is a constructional view of a known LAN system in semiconductor manufacturing apparatuses.

FIG. 1 illustrates a basic concept of a LAN system on a semiconductor manufacturing apparatus side in a remote control system for one or more semiconductor manufacturing apparatuses according to the present invention. FIG. 2 schematically illustrates a basic concept of the remote control system for one or more semiconductor manufacturing apparatuses according to the present invention. FIG. 3 schematically illustrates a remote control system for one or more semiconductor manufacturing apparatuses according to a first embodiment of the present invention. FIG. 4 schematically illustrates a remote control system for one or more semiconductor manufacturing apparatuses according to a second embodiment of the present invention. FIG. 5 schematically illustrates a remote control system for one or more semiconductor manufacturing apparatuses according to a third embodiment of the present invention. FIG. 6 schematically illustrates a remote control system for one or more semiconductor manufacturing apparatuses according to a fourth embodiment of the present invention. FIG. 7 schematically illustrates a remote control system for one or more semiconductor manufacturing apparatuses according to a fifth embodiment of the present invention.

Basic Construction

First of all, the basic construction of a remote control system for one or more semiconductor manufacturing apparatuses according to the present invention will be described with reference to FIG. 1 and FIG. 2.

The system on the semiconductor manufacturing apparatus side in the remote control system for one or more semiconductor manufacturing apparatuses of the present invention primarily include a plurality of (N) semiconductor manufacturing apparatuses D1, D2, . . . , DN, a terminal server TS connected with the semiconductor manufacturing apparatuses D1, D2, . . . , DN, and a host device H connected with the terminal server TS through a LAN card such as an Ethernet card, as shown in FIG. 1.

Connected to the host device H are a display device in the form of a CRT, a printer for printing data displayed on the CRT, a keyboard for entering data, an input and output means I/O and the like such as a mouse which is a pointing device for determining a prescribed location on the CRT. Also, a communication means or element Com such as a modem or terminal adapter is connected with the host device H for connection with a public communication line. Here, note that in place of the communication means Com, the host device H may be connected to a communication means or element Com' such as an access server, router, etc., which is capable of performing data communications with an external network system such as the Internet or the like via a LAM.

Moreover, the host device H is provided with software having a telecommunications function, a point-to-point protocol (PPP), and an Internet protocol (IP) routing function, whereby it is made possible to mutually communicate with the remote operation device having a communication means or element Com.

Here, note that the remote operation device L such as a computer terminal, etc., lying in a remote place in a remote control system for semiconductor manufacturing apparatuses according to the present invention may be a stand-alone terminal device, or a host device or a terminal device in a network system which is different from the remote side network system, and is equipped with the same network operating system for performing remote operation with the same screen or an operating system capable of executing the same programs and software or the like necessary for communicating with the host device.

Moreover, similar to the semiconductor manufacturing apparatus side system, the remote operation device L is connected with an output device in the form of a CRT, a printer for printing the data displayed on the CRT, a keyboard for entering data, an input and output means I/O in the form of a mouse acting as a pointing device for determining a prescribed location on the CRT, and so on. Also, the remote operation device L is connected with a communication means or element Com such as a modem, a terminal adapter, etc., for connection with a public communication line. In addition, when connected to a LAN, the remote operation device L may be connected to an external network system such as the Internet or the like for data communications through a router in place of the modem or terminal adapter.

As shown in FIG. 2, first, the remote operation device L is made to communicate with the host device H on the semiconductor manufacturing apparatus side by using the input means such as the keyboard, mouse or the like connected with the remote operation device L (see an arrow ① in FIG. 2).

The protocol to be used at this time is not limited in any manner as long as it can establish communications between the host device H on the side of the semiconductor manufacturing apparatuses and the remote operation device L, with a display of the same screen and the same remote operations to be described later being able to be performed by means of the remote operation device L. However, from the viewpoint of general versatility, it is preferred to use TCP/IP as a path control protocol and an X protocol for GUI control in UNIX systems or TCP/IP (Transmission Control Protocol/Internet Protocol), which is a standard protocol for path control in the Internet, and HTTP (Hyper Text Transfer Protocol), which is a standard hypertext communication control protocol. Also, note that when a plurality of pieces of data are to be transmitted, it is preferable to perform transmissions in a multi-part form.

For instance, such a transmission can be made from the remote operation device L by using an HTTP 1.0 protocol in the form of a POST method, designating a predefined URI as the URI immediately after the POST method, including sending data in a body portion, and using a content-type header as represented by the following table 1.

TABLE 1

| Categories of Data | Content-type Values |
| --- | --- |
| xml | text/xml |
| CSV | text/cay |
| Binary Table | Application/X - arib - btable |

TABLE 1-continued

| Categories of Data | Content-type Values |
| --- | --- |
| JPEG | Image/jpeg |
| PNG | Image/X - rib - png |
| MNG | Image/X - arib - mng |

In this case, authentication is designated by the use of an authorization header and encryption is made by using BASIC. A secret identification code is registered in advance in the host device H on the semiconductor manufacturing apparatus side.

In this manner, an operator can communicate, through the communication line, with the host device H on the semiconductor manufacturing apparatus side, which is on the server side, from the remote operation device L, which is on the client side. When the remote operation device L is properly registered by the host device H (i.e., authentication and verification of the secret identification number are made), the CRT (the output device) of the remote operation device L displays the same screen as that displayed on the CRT (i.e., output device) of the host device H, whereby it becomes possible for the operator to carry out the same operations as in the host device H, by using an input device such as a keyboard, mouse and the like of the remote operation device L (data link: an arrow ② in FIG. 2).

Hereinafter, preferred embodiments of a remote control system for semiconductor manufacturing apparatuses according to the present invention will be described in more detail with reference to the accompanying drawings.

Embodiment 1

A first embodiment of the present invention is an example of a system configuration in which a host device H of one or more semiconductor manufacturing apparatuses and a remote operation device L as a client terminal are connected to each other by using the most common analog network as a communication line, as shown in FIG. 3.

In this embodiment, for instance, the system on the semiconductor manufacturing apparatus side is a device maker such as a semiconductor manufacturing company, etc., and the remote operation device side is a site for maintaining a device supplier or the like.

The system on the semiconductor manufacturing apparatus side mainly comprises a plurality of (N) semiconductor manufacturing apparatuses D1, D2, . . . , DN, a terminal server TS connected in series with the semiconductor manufacturing apparatuses D1, D2, . . . , DN through cables such as RS232C cables, etc., a host device H connected with the terminal server TS through LAN cards such as Ethernet cards, and a communication means or element Com in the form of a modem connected with the host device H.

Connected with the host device H are an unillustrated input means such as a keyboard, a mouse, et., and an unillustrated output means such as a CRT, a printer, etc. In addition, for example, an X Window System or the like, which controls GUI (graphical user interface) on an OS (operating system) of a UNIX system, is installed on the host device H so as to perform monitoring, event processing, alarming, lot processing, etc., on the N semiconductor manufacturing apparatuses.

On the other hand, the remote operation device L comprises a personal computer system including an X terminal installed with X server software as in the host device H, and a personal computer installed with a UNIX system with the X Window operating thereon, and an X server emulator.

Connected with the remote operation device L are a communication means or element Com in the form of a modem, an unillustrated input means such as a keyboard, a mouse, etc., and an unillustrated output means such as a CRT, a printer, etc. The host device H on the semiconductor manufacturing apparatus side and the remote operation device L as a terminal equipment are connected in series with each other through the modems Com. Moreover, control software enabling the arrival of a message at the modem is built into the host device H, and the host device H and the remote operation device L are connected to each other to provide a data link therebetween through the PPP protocol so as to perform socket communications through TCP/IP on the PPP data link.

By connecting the host device H and the remote operation device L through an X protocol using the TCP/IP connection in this manner, it becomes possible for the remote operation device L to display the same screen as in the host device H and operate or manipulate the host device H. Moreover, owing to the TCP/IP connection, transfer of files can be made between the host device H and the remote operation device L, so that it becomes possible to replace the programs, operation parameter files, etc., in the host device H from the remote operation device L through remote control.

In addition, by using a remote log-in function based on the TCP/IP connection, it becomes possible to check the status or condition of tasks, processes, hard disk drives, memories, et., of the host device H as well as its peripherals.

Embodiment 2

A second embodiment of the present invention illustrates an example of a system configuration in which a host device H is connected to a remote operation device L as a client terminal by the use of an ISDN line of a higher transmission speed as a communication line, as shown in FIG. 4.

In this embodiment, too, for example, the system on the semiconductor manufacturing apparatus side is a device maker such as a semiconductor manufacturing company, etc., and the remote operation device side is a site for maintaining a device supplier or the like.

The second embodiment is substantially similar to the first embodiment excepting the use of a terminal adapter as a communication means Com in place of the modem employed in the first embodiment, and the use of a digital communication line having a transmission speed higher than that of the telephone line as employed in the first embodiment. Thus, a detailed explanation on this embodiment is omitted.

Embodiment 3

A third embodiment of the present invention illustrates an example of a system configuration in which a plurality of host devices for one or more semiconductor manufacturing apparatuses are connected to a remote operation device L as a client terminal through the Internet as a communication line by the use of a router, as illustrated in FIG. 5.

In this embodiment, for example, the system on the semiconductor manufacturing apparatus side is a relatively large device maker such as a semiconductor manufacturing company, etc., larger in scale than the one in the aforementioned first or second embodiment, and the remote operation device side is a site for maintaining a device supplier or the like.

The system on the semiconductor manufacturing apparatus side includes a plurality of local area networks LAN1, LAN2, . . . , LANn connected to the Internet through a router as a communication means Com'. Each of the local area networks LAN1, LAN2, . . . , LANn comprises a plurality of (N, . . . , or M) semiconductor manufacturing apparatuses (D1, D2, . . . , DN; or . . . , or D1, D2, . . . , DM), a terminal server TS1, or TS2, . . . , or TSn connected in series with the semiconductor manufacturing apparatuses (D1, D2, . . . , DN; or . . . , or D1, D2, . . . , DM), respectively, through RS232C cables or the like, and a host device H1, or H2, . . . , or Hn connected with the corresponding terminal server TS1, or TS2, . . . , or TSn through LAN cards such as Ethernet cards.

Connected to each of the host devices H1, H2, . . . , Hn are an unillustrated input means such as a keyboard, a mouse, etc., and an unillustrated output means such as a CRT, a printer, etc. In addition, the X Window System for controlling the GUI on an OS of a UNIX system is introduced into each of the host devices H1, H2, . . . , Hn so as to perform monitoring, event processing, alarming, lot processing, etc., of the plurality of semiconductor manufacturing apparatuses connected with each of the local area networks LAN1, LAN2, . . . , LANn.

On the other hand, the remote operation device L comprises a personal computer system including an unillustrated X terminal installed with X server software as in the respective host devices H1, H2, . . . , Hn, and a personal computer having a UNIX system installed with the X Window System and an X server emulator. Connected to the remote operation device L are a router as a communication means, an unillustrated input means such as a key board, a mouse, etc., and an unillustrated output means such as a CRT, a printer, etc.

The system on the semiconductor manufacturing apparatus side and the remote operation device L can be connected to each other by way of the Internet through the respective routers Com' arranged at an inlet and an outlet to the Internet.

The router connected with the system on the semiconductor manufacturing apparatus side serves to store an Internet address and private internal addresses possessed by the semiconductor manufacturing apparatus side system, and perform relay and access control such as limitation to access or so on.

On the other hand, the remote operation device L can be connected to a desired one of the host devices H1, H2, . . . , Hn on the semiconductor manufacturing apparatus side by designating the address of the desired host device. Thus, by designating the address of any of the plurality of host devices H1, H2, . . . , Hn, it is possible to display the same display content as that in each of the host devices H1, H2, . . . , Hn as a corresponding window, and manipulate it in a desired way.

In this manner, the remote operation device or terminal L can perform maintenance and remote log-in operations, etc., of the terminal servers TS1, TS2, . . . , TSn connected with the host devices H1, H2, . . . , Hn, respectively. Moreover, it is also possible to replace the programs and the like, rewrite the information in flash ROMs, and manipulate a logging monitor and the like from the remote operation device L, as in the aforementioned first and second embodiments.

Embodiment 4

A fourth embodiment of the present invention illustrates an example of a system configuration in which a plurality of host devices H1, H2, . . . , Hn on the semiconductor manufacturing apparatus side and a remote operation device L as a client terminal are connected to each other by way of a local area network (LAN) or a wide area network (WAN) by the use of routers, as shown in FIG. 6.

In this embodiment, for instance, the system on the semiconductor manufacturing apparatus side comprises one section such as production lines in a device maker such as a semiconductor manufacturing company, etc., and the remote operation device side is another section such as a management section for semiconductor manufacture in the same company.

This fourth embodiment is substantially similar to the aforementioned third embodiment excepting that an in-house local area network or an in-house wide area network is used in place of the Internet, and hence a detailed explanation thereof is omitted.

Here, note that beside such a dedicated line, an intranet network using frame relays, cell relays (ATM) or the like can be employed as the wide area network.

Embodiment 5

A fifth embodiment of the present invention represents a remote control system with an access server for one or more semiconductor manufacturing apparatuses, which is adaptable to a variety of communication lines, as shown in FIG. 7.

In this embodiment, the system on the semiconductor manufacturing apparatus side includes a plurality of local area networks LAN1, LAN2, ..., LANn, and an access server Ac having a communication means and connected to the plurality of local area networks LAN1, LAN2, ..., LANn through LAN cards such as Ethernet cards. Each of the local area networks LAN1, LAN2, ..., LANn comprises a plurality of (N, or ..., or M) semiconductor manufacturing apparatuses (D1, D2, ..., DN; or ..., or D1, D2, ..., DM), a terminal server TS1, or TS2, ..., or TSn connected in series with the semiconductor manufacturing apparatuses (D1, D2, ..., DN; or ..., or D1, D2, ..., DM), respectively, through RS232C cables or the like, and a host device H1, or H2, ..., or Hn connected with the corresponding terminal server TS1, or TS2, ..., or TSn through LAN cards such as Ethernet cards.

On the other hand, the system on the remote operation device side includes a variety of remote operation devices L1, L2, L3, L4 as terminals. A first remote operation device L1 is connected through a modem Com to an analog line or public telephone line, which is in turn connected to the system on the semiconductor manufacturing apparatus side, as in the aforementioned first embodiment. A second remote operation device L2 is connected through a terminal adapter Com to an ISDN line or network, which is in turn connected to the system on the semiconductor manufacturing apparatus side, as in the aforementioned second embodiment. A third remote operation device L3 is connected through a router Com' to the Internet, which is in turn connected to the system on the semiconductor manufacturing apparatus side, as in the aforementioned third embodiment. A fourth remote operation device L4 is connected through a router Com to a local area network LAN or a wide area network WAN, which is in turn connected to the system on the semiconductor manufacturing apparatus side, as in the aforementioned fourth embodiment. Thus, the same display screens as those in the respective host devices H1, H2, ..., Hn can be displayed at the respective remote operation devices L1, L2, L3, L4.

The access server Ac has an authentication function and can enhance the security level by filtering IP addresses, limiting service support, etc.

As described in the foregoing, the present invention can provide the following excellent effects.

(1) The Same Screen and the Same Operations

The same operations as taken in the trouble procedure of a semiconductor manufacturing apparatus generated at the place of introduction of the system on the semiconductor manufacturing apparatus side (customer side) can be carried out and monitored by a device maker or the like on the remote operation device L side.

(2) Monitoring Simultaneously at a Remote Place

By displaying the contents of use and the operations in the place of introduction of the system on the semiconductor manufacturing apparatus side (customer side) simultaneously at a remote location on the remote operation device L side, it is possible to monitor problems in operation and situations, in which trouble has occurred, at a device maker's factory.

(3) Resource Monitoring of One or More Semiconductor Manufacturing Apparatuses

It is possible to know the status of one or more semiconductor manufacturing apparatuses and the states of memories and resources of the OS. In addition, the location and cause of trouble in the manufacturing process can be specified and ascertained by monitoring the hardware, peripherals, tasks, memory dump, etc.

(4) Remote Trouble Analysis and Reproduction

A service person or the like in charge of maintaining the one or more semiconductor manufacturing apparatuses can reproduce the situations of trouble in detail at a remote place on the remote operation device L side without going to the site where the system on the semiconductor manufacturing apparatus side is introduced, and a system design expert, engineer or the like can also understand and analyze the state of trouble while staying in a design room or the like on the remote operation device L side.

(5) Accurate Understanding with Customers

The achievement of the same screen and the same operations enables smooth communication from and a good understanding with those who have introduced the system on the semiconductor manufacturing apparatus side (customers).

(6) Reduction in Service Person's Business Trip Costs

The traveling expenses can be cut off when a service person or the like in charge of maintaining the one or more semiconductor manufacturing apparatuses visits the site of introduction of the system on the semiconductor manufacturing apparatus side, and experts can take appropriate measures from a remote place. In addition, the support and service system can be reduced by decreasing the number of people such as special service persons.

(7) Shortening of a Trouble Analysis Period

A trouble analysis during process operation of the one or more semiconductor manufacturing apparatuses can be made more accurately in a short period of time. Thus, an investigation of trouble causes and measures for preventing such trouble can be carried out or taken without anyone visiting the remote place in which the trouble has occurred.

(8) Improvements in the Operating Ratio of the Apparatuses

The trouble recovery time of the one or more semiconductor manufacturing apparatuses is decreased, thereby bringing about such effects as reduction in downtime, improvements in the operating ratio of the apparatuses, reduction in MTTR, improvements in MTBF, etc. As a result, it is possible to improve the manufacturing efficiency and throughput of the entire factory.

(9) Reduction in Service Locations

A remote maintenance center can be built in the factory where the one or more semiconductor manufacturing apparatuses are set up, for performing remote maintenance operations for the devices delivered all over the world. Thus, it is possible to reduce the number of service locations and hence operation costs thereof.

(10) Dealing with Complaints

The one or more semiconductor manufacturing apparatuses can be monitored from a remote place immediately after a claim or complaint has been reported from a device maker using the one or more semiconductor manufacturing apparatuses. As a result, the first response to such an on-call claim can be quickly done, thus making it possible to improve confidence with the customer (the device maker).

(11) Demonstration

To a customer who tries to introduce one or more semiconductor manufacturing apparatuses, the same screen as that in an apparatus can be displayed by remotely connecting a notebook computer, which is brought into the customer, to a demonstration machine installed in a factory before the one or more semiconductor manufacturing apparatuses are actually delivered to the customer, whereby the demonstration and display of a prototype under development can be made, thus enabling the formation of a screen into which customer's demands or requests are taken to its maximum.

(12) Replacement of Programs

Even in the event that there takes place a replacement work for application programs in the one or more semiconductor manufacturing apparatuses, this can be done without the need of a service person going to a remote place in which the one or more semiconductor manufacturing apparatuses exist, thus making it possible to reduce the number of man-hours and hence expenditure.

(13) File Transfer

Since logging information such as alarms, operation information, etc., generated in the one or more semiconductor manufacturing apparatuses is stored as a file, the file at the time of a failure can be transferred through remote connection, so that the status of one or more semiconductor manufacturing processes as well as the history and symptom of failure can be analyzed at the factory.

(14) Comparison Between Apparatus Operating Statuses

Comparison of a remote monitor where failure occurs with the monitor of a normal operation in the manufacturing device maker can be utilized to specify the cause of the failure.

(15) Improvements in Safety by User Authentication

Connection can be made only when there is a user authentication, whereby a third person can be prevented from connecting to the network, thus precluding the leakage of secrets and the invasion of computer virus for improved safety.

While the invention has been described in terms of preferred embodiments, those skilled in the art will recognize that the invention can be practiced with modifications within the spirit and scope of the appended claims.

What is claimed is:

1. A remote control system for one or more semiconductor manufacturing apparatuses comprising:
a local area network system comprising a plurality of host devices each connected with one or more semiconductor manufacturing apparatuses, and a router connected with said host devices; and
a remote operation device including a router that accesses said host devices by way of a communication line;
wherein said host devices are each provided with an IP routing function for achieving remote control operation from said remote operation device, and a communication element having a call incoming function of receiving a call incoming from said communication line, and
said host devices each perform user authentication when said remote operation device connects to said host devices, so that said remote operation device thus authenticated can individually simultaneously display a same screen as that displayed on each of said host devices, permitting said remote operation device to remotely control and operate said host devices,
wherein said remote operation device thus authenticated replaces operation parameter files of said host devices through remote control.

2. The remote control system for one or more semiconductor manufacturing apparatuses according to claim 1, wherein said communication line connecting between said host devices and said remote operation device comprises the Internet.

3. The remote control system for one or more semiconductor manufacturing apparatuses according to claim 1, wherein said communication line connecting between said host devices and said remote operation device comprises one of a local area network and a wide area network.

4. A remote control system for one or more semiconductor manufacturing apparatuses comprising:
a local area network system comprising a plurality of host devices each connected with at least one semiconductor manufacturing apparatuses, and an access server connected with said host devices; and
a plurality of remote operation devices each having a communication element accessible to said host devices by way of a communication network;
wherein said host devices are each provided with an IP routing function for achieving remote control operation from each of said remote operation devices, and
said host devices each perform user authentication when each of said remote operation devices connects to said host devices,
wherein each of said remote operation devices thus authenticated can individually simultaneously display a same screen as that displayed on each of said host devices, permitting said remote operation devices to remotely control and operate said host devices,
wherein each of said remote operation devices thus authenticated replaces operation parameter files of each of said host devices through remote control.

5. The remote control system for one or more semiconductor manufacturing apparatuses according to claim 4, wherein said communication network connecting between said host devices and said remote operation devices comprises at least one of a public telephone network, an ISDN network, the Internet, a local area network and a wide area network.

6. The remote control system for one or more semiconductor manufacturing apparatuses according to claim 1, wherein said remote operation device enables same operations as those carried out by said host devices.

7. The remote control system for one or more semiconductor manufacturing apparatuses according to claim 4, wherein each of said remote operation devices enables same operations as those carried out by said host devices.

8. The remote control system for one or more semiconductor manufacturing apparatuses according to claim 1, further comprising a display screen associated with the host device and a display screen associated with the remote operation device.

9. The remote control system for one or more semiconductor manufacturing apparatuses according to claim 4, further comprising a display screen associated with the host device and a display screen associated with the remote operation device.

* * * * *